(12) United States Patent
Kang

(10) Patent No.: US 7,716,507 B1
(45) Date of Patent: May 11, 2010

(54) VERSATILE CLOCK MANAGEMENT SYSTEM FOR A SINGLE PIN SERIAL INTERFACE PROTOCOL

(75) Inventor: Dae Woon Kang, Lafayette, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 1275 days.

(21) Appl. No.: 11/225,500

(22) Filed: Sep. 13, 2005

(51) Int. Cl.
G06F 1/32 (2006.01)
(52) U.S. Cl. .......................... 713/322; 710/34; 713/320
(58) Field of Classification Search ................. 713/400, 713/320, 322; 710/34
See application file for complete search history.

(56) References Cited

U.S. PATENT DOCUMENTS

| | | | |
|---|---|---|---|
| 6,166,572 A | 12/2000 | Yamaoka | |
| 2002/0090045 A1 | 7/2002 | Hendrickson | |
| 2004/0037383 A1 | 2/2004 | Song | |
| 2004/0155687 A1 | 8/2004 | Lee et al. | |

OTHER PUBLICATIONS

Ansgar Pottbacker et al., "A Si Bipolar Phase and Frequency Detector IC for Clock Extraction Up to 8 Gb/s", IEEE Journal of Solid-State Circuits, vol. 27, No. 12, Dec. 1992, pp. 1747-1751.
Hui Zhang et al., "Low-Swing On-Chip Signaling Techniques: Effectiveness and Robustness", IEEE Transactions on Very Large Scale Integration (VLSI) Systems, vol. 8, No. 3, Jun. 2000, pp. 264-272.
Benny Lai et al., "A Monolithic 622Mb/s Clock Extraction Data Retiming Circuit", ISSC91/Session 8/Hard-Disk and Data-Communication IC's/Paper TP 8.7, 1991 IEEE International Solid-State Circuits Conference, 3pages.
Dae Woon Kang et al., "A Low Power Methodology for Portable Electronics", 8 pages.
Chen Hau Jiun et al., "A Monolithic 622MB/S Half Rate Clock and Data Recovery Circuit Utilizing a Novel Linear Phase Detector", 2004 IEEE, pp. 348-351.
Dae Woon Kang et al., "System and Method for Providing a Robust Ultra Low Power Serial Interface With Digital Clock and Data Recovery Circuit for Power Management Systems", U.

*Primary Examiner*—Albert Wang

(57) ABSTRACT

The present invention provides a versatile system for management of clocking for a serial interface. Serial input data, comprising a plurality of fields, and preceded by a specific input pattern, is provided to a receiver element. Within one of the fields in the serial input data, some information concerning the size the current serial data payload is included. Responsive to receiving the specific input pattern, the system of the present invention asserts a clock enable signal to activate clocking. A countdown corresponding to the size the current serial data payload is initiated. Once that countdown has reached zero, the clocking for the interface is disabled.

20 Claims, 3 Drawing Sheets

VERSATILE CLOCK MANAGEMENT SYSTEM FOR A SINGLE PIN SERIAL INTERFACE PROTOCOL

TECHNICAL FIELD OF THE INVENTION

The present invention relates generally to power management systems for wireless communication devices and, more particularly, to apparatus and methods for providing a versatile clock management system for a robust ultra low power serial interface device.

BACKGROUND OF THE INVENTION

The escalating deployment of wireless networking and communications technologies is causing a corresponding increase the number of wireless and portable devices, and applications for those devices. As a result, increasingly more computing resources are integrated into and utilized by portable and wireless applications ("portables"). Markets for portables demand devices with high data throughput rates, for applications such as multimedia and streaming media, voice over data, and others. At the same time, markets for portables also demand devices that are convenient to use—both from a form factor and use-time perspective. Thus, designers and manufacturers are faced with demands for greater versatility and processing power, coupled with demands for smaller devices with longer battery life (i.e., very low power consumption).

Initially, at least, attempts were made to address battery life concerns by improving battery systems—both battery density and charging efficiency. Unfortunately, however, such approaches were only successful for a short time, as the steadily increasing demands on portable performance outpaced the ability to improve battery systems. Designers and manufacturers have realized that the performance demands of new portables cannot be met by simply by increasing energy density in batteries.

To increase the functionality and use time of portables, designers and manufacturers are turning to high efficiency management of system functions. When the amount of energy that is needed to complete a function is decreased, a battery has more energy left to perform other processes. This simple approach to energy management has been applied throughout portable devices and systems.

Consider, for example, that various portable devices and systems (e.g., MP3 players, digital cameras) do not require full operation of all device circuitry all the time. There are certain times when various components or functions are idle and, depending upon the application, may be powered down to reduce overall system power consumption. Unfortunately, however, many digital data processing and transmission applications rely upon clocking signals and systems for recovery from power-down states, as well as for routine operation. As a result, in a number of conventional systems, clocking functions or circuitry cannot be powered down even where its associated operational circuitry is idle. Typically, a clocking element or system has a relatively high switching factor, which results in significant power consumption.

This concern becomes even more important when—as is the case in many modern portable devices and systems—a certain device or component relies upon a serial interface. In systems where clocking is always active, even when data transmission or communication may be idle, the interface and associated circuitry are also always active and consuming power unnecessarily.

As a result, there is a need for a system that provides a versatile clock management for ultra low power applications—particularly for low power portable systems and devices utilizing serial interfaces; a system that provides clocking functionality only when device operations require it, and otherwise powers down clocking to provide efficient, low-power data processing or communication in an easy, cost-effective manner.

SUMMARY OF THE INVENTION

The present invention provides a versatile system, comprising various constructs and methods, for clock management in ultra low power applications—particularly low power portable systems and devices utilizing serial interfaces. The present invention provides a single-pin serial interface system, having clocking functionality that may be cycled on or off as desired or needed for proper device operation. When device processing or communication is idle, clocking may be powered down to lower device and overall system power consumption. The system of the present invention thus provides efficient, low-power data processing or communication in an easy, cost-effective manner.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

Figure 1:
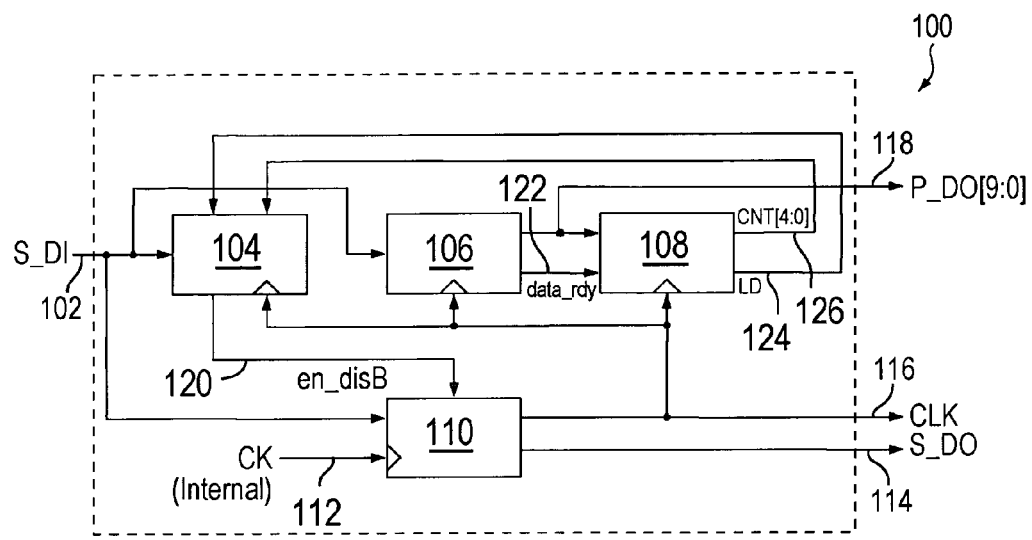
FIG. 1 provides an illustration depicting one embodiment of a receiver illustrating certain aspects of the present invention.

While the making and using of various embodiments of the present invention are discussed in detail below, it should be appreciated that the present invention provides many applicable inventive concepts, which can be embodied in a wide variety of specific contexts. The present invention is hereafter illustratively described in conjunction with the design and operation of clock management systems, optimized to reduce power consumption for wireless devices. Certain aspects of the present invention are further detailed in relation to high-performance single-pin serial interface and a corresponding operational protocol. Although described in relation to such constructs and schemes, the teachings and embodiments of the present invention may be beneficially implemented with a variety of digital communications technologies. The specific embodiments discussed herein are, therefore, merely demonstrative of specific ways to make and use the invention and do not limit the scope of the invention.

The present invention provides a versatile system, comprising various constructs and methods, for clock management in ultra low power applications—particularly low power portable systems and devices utilizing serial interfaces. The present invention defines a single-pin serial interface system, having clocking functionality that may be cycled on or off as desired or needed for proper device operation. When device processing or communication is idle, clocking may be powered down to lower device and overall system power consumption. The system of the present invention may thus be implemented to provide efficient, low-power data processing or communication in an easy, cost-effective manner.

Serial data streaming techniques have increased in prevalence in the field of interface microelectronics, as manufacturers now commonly adopt such technology for intra-system connections. As the sophistication of electronic technology continues to develop, a number of parallel transmission techniques have proven inadequate to accommodate higher transmission speeds and larger data payloads. Designing systems with wide parallel word paths is typically cumbersome, and presents serious technical challenges in the areas of noise, power, speed and cost.

Serialization of data communication provides a number of performance and implementation advantages—especially for low-power portable devices. For example, serialization reduces signal emissions otherwise associated with multiple parallel lines. Serialization also facilitates increased mechanical integrity and reliability of small portable devices (e.g., flip-phones), by limiting the number of wires running through small-diameter hinges commonly implemented on such devices. Given such advantages, serialization of communication transmissions has increasingly expanded from inter-system to intra-system level interfaces. Transmitting serialized data through a system in the same form it was sent over a network is a natural choice.

Serialization techniques have opened the door to a number of new devices and applications, particularly in the ultra-portable realm of cell phones and battery-powered devices. Such systems often require processor or controller functionality implemented in various locations throughout a device, as cameras and other convergent functions are increasingly integrated therein. Thus, within a single device, there may be multiple constructs that function both as senders and receivers of data. This raises an issue of how to efficiently provide serialized data transmission in opposite directions (i.e., bi-directional serialization). Furthermore, whereas legacy systems often utilized synchronous data transmission based upon a central system or processor clock signal, modern high-performance systems increasingly utilize asynchronous data transmission. The combination of bi-directional serialization and asynchronous data transmission requires a careful balancing of needs for high-speed clocking and highly tailored input/output (I/O).

In asynchronous serial data transmission systems, clock recovery from a NRZ (Non-Return to Zero) data stream is commonly utilized, since there is no common clock connection between a data sender and receiver. Typically, a phase lock loop (PLL) is employed within a data receiver to phase lock to received data and control the frequency of a new, local clock. PLL circuitry is, however, is generally cumbersome and tends to be implemented at the expense of increased cost and power consumption. In a low-power portable system, this is particularly undesirable. Further contributing to power consumption in such in high-speed serial data transmission applications, clocking functions usually remain active and switch at very high rates.

Comprehending these and other related issues, the present invention provides a versatile clock management system for a serial data interface. The interface and its operational protocol are provided such that clocking has a self-enable/self-disable function. Clocking initiation and duration parameters are provided as fields or frames in a serial data transmission, along with valid serial data input. Efficient asynchronous serial data transfer is thus provided through a single pin serial interface.

For purposes of illustration and explanation, portions of the present invention are hereafter described in relation to a clock and data recovery system of the type described in U.S. patent application Ser. No. 11/095,288, "System and Method for Providing a Robust Ultra Low Power Serial Interface with Digital Clock and Data Recovery Circuit for Power Management Systems", also assigned to National Semiconductor Corporation, and herein incorporated by reference.

Certain aspects of the present invention are described now with reference to FIG. 1, which depicts one embodiment of a receiver element or system 100 in accordance with the present invention. Receiver element 100 may comprise a stand-alone device or apparatus, or a discrete functional portion of some integrated device or apparatus. In certain embodiments, element 100 may be provided by cooperative operation of functional portions of independent devices or structures. Element 100 comprises a single serial input pin 102 (S_DI), communicatively coupled to some sending device (not shown). Element 100 further comprises a clock enabler function 104, a serial to parallel converter function 106, a command decoder function 108, and clock/data synchronizer function 110. Element 100 further comprises an internal clock 112 (CK), having a frequency close to or matching the frequency of input 102. Element 100 may comprise a serial data output 114 (S_DO), a synchronized clock 116 (CLK) that is active while series data (S_DI) is valid, and a synchronized parallel output 118 (P_DO).

Input 102 provides input to functions 104, 106 and 110. Function 110 also receives internal clock 112 as an input, and outputs clock 116 and serial output 114. Clock 116 is provided to functions 104, 106 and 108. Function 104 outputs a clock enable/disable signal 120 (en_disB) to function 110. Function 106 outputs a data ready signal 122 (data_rdy) to function 108. Function 106 also outputs parallel output 118, which is coupled as an input to function 108. Function 108 outputs load signal 124 (LD) and a counter value 126 (CNT [4:0]), both of which are coupled back as inputs to function 104.

Figure 2:
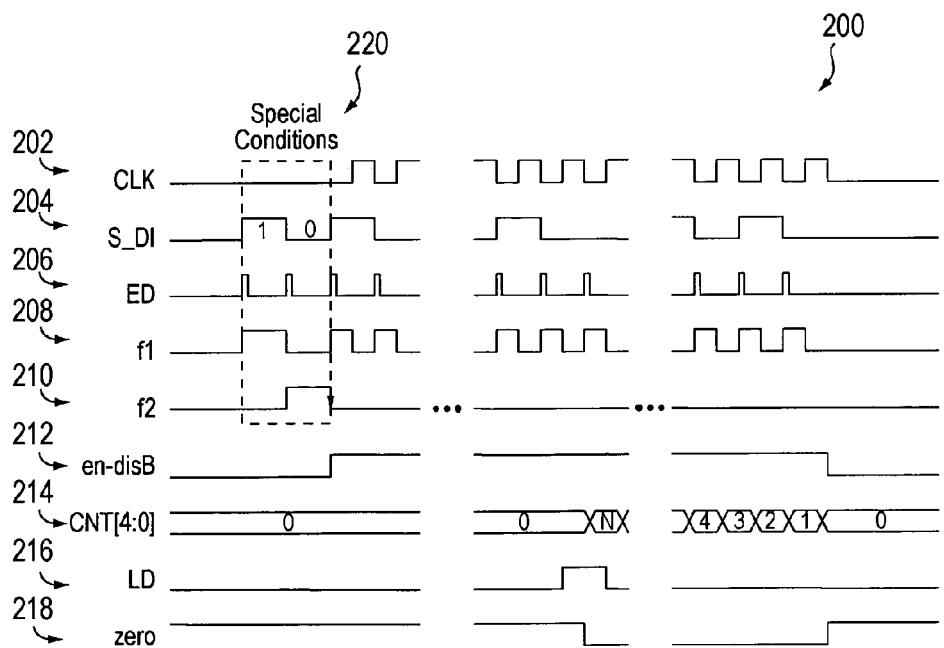
FIG. 2 provides an illustrative timing diagram for operation of the receiver of FIG. 1.

Referring now to FIG. 2, an illustrative timing diagram 200 depicts certain operational characteristics of a system of the type depicted in FIG. 1. Diagram 200 comprises: plot line 202, representing CLK signal 116; plot line 204, representing S_DI signal 102; plot line 206, representing an edge detection trace of plot line 204; plot line 208, representing a reset signal (f1); plot line 210, representing a trigger condition signal (f2); plot line 212, representing en_disB signal 120; plot line 214, representing CNT[4:0] signal 126; plot line 216, representing LD signal 124; and a plot line 218, signal zero indicating a data idle condition when asserted.

The operation of element 100 is described now in reference to both FIGS. 1 and 2. In operation, function 104 turns asserts clock enable signal 120 once a specific input condition 220 occurs. Condition 220 comprises an event where series data input 102 toggles from 0 to 1 and back to 0 without an assertion of clock signal 112. Enable signal 120 is gated with the output of a clock and data recovery system, of the type described in U.S. patent application Ser. No. 11/095,288, inside function 110 to provide clock signal 116. In other words, clock signal 116 is active during enable signal active-high. Then, series input 102 is latched and shifted to, for example, a 9-bit shift-register inside function 106 by signal 116. When a 10$^{th}$ data bit is asserted, data in the 9-bit shift-register and the 10$^{th}$ data bit are output to parallel output 118.

Data for operation commands and operation sequences are structured to provide, within the parallel data output, operational information for use by the components in system 100. Each data frame in an operation command comprises current data frame order information—for example: P_DO[9:8]=11 indicates first frame; P_DO[9:8]=00 indicates second frame; P_DO[9:8]=01 indicates third frame; and P_DO[9:8]=10 indicates fourth frame. The first frame in all operation sequences (e.g., read operation, write operation) comprises an indicator of the number of frames in a command—for example: P_DO[0]=1 indicates a 1-frame command; P_DO[1]=1 indicates a 2-frame command; and P_DO[3]=1 indicates a 3-frame command.

Parallel data 118 (P_DO[9:0]) is decoded by counter finite state machine 108, which generates load signal 124, and counter value 126 (CNT[4:0]), along with frame number information for a down-counter inside function 104. Counter number is stepped down with clock signal 116. When counter value reaches 0 (at the end of last frame data), en_disB 120 is disabled or de-asserted. Therefore, clock 116 is synchronized with series data 102, and active only during periods where series data 102 is valid.

Figure 3:
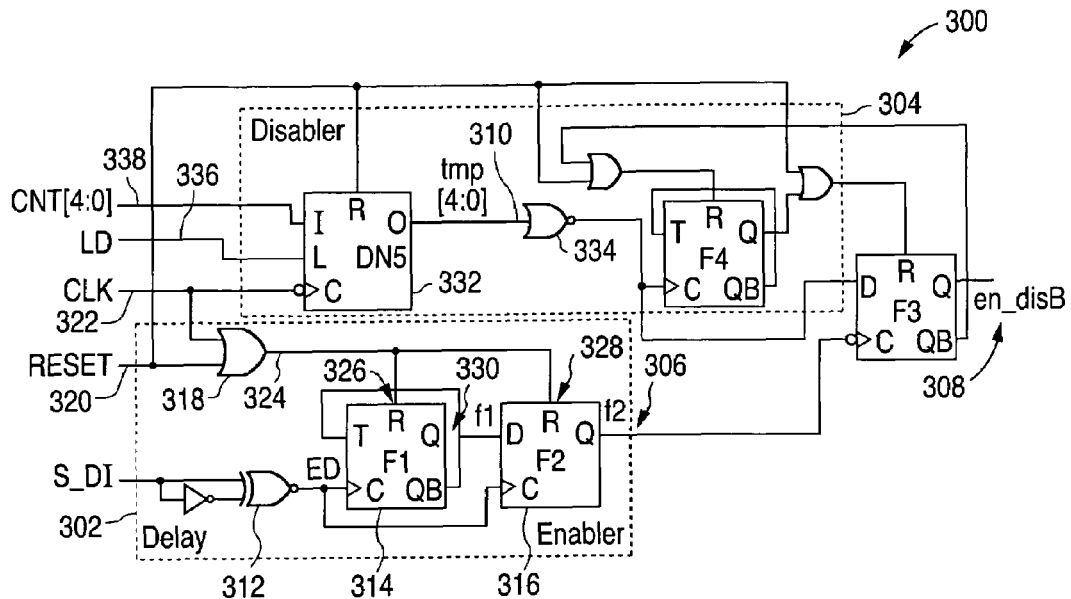
FIG. 3 provides an illustration depicting one embodiment of a clock enabler illustrating certain aspects of the present invention.

Referring now to FIG. 3, one illustrative embodiment of a clock enabler function 300 in accordance with the present invention is depicted. Function 300 comprises an enabler element 302 and a disabler element 304. Enabler 302 detects special frame start condition 220, which comprises an event where series data input (S_DI) toggles from 0 to 1 and back to 0 without an assertion of clock signal (CLK). The output 306 (f2) of enabler 302 corresponds to the previously described trigger condition signal (f2). Function 300 comprises an output 308 that corresponds to clock enable/disable signal (en_disB). Output 306 renders output 308 active high when a counter output 310 (tmp[4:0]) within disabler 304 is 0.

Enabler 302 comprises an edge detection portion 312, a first flip-flop 314 (e.g., a T-type), and a second flip-flop 316 (e.g., a D-type). Enabler 302 comprises a reset element 318, having a reset input 320 (RESET) and clock input 322 (CLK). The output 324 of element 318 provides a reset signal to reset inputs 326 and 328 of flip-flops 314 and 316, respectively. While clock 322 (CLK) is active, output signal 306 (f2) is reset by output 330 of flip-flop 314, which corresponds to gated reset signal (f1).

Disabler 304 comprises a down counter 332 (DN5) and a zero detector 334 (NOR gate). Down counter 332 receives, as inputs, load signal 336 (LD) and a counter value 338 (CNT[4:0]). When the value of down counter 332 reaches 0, the output signal of zero detector 334 forces output 308 inactive.

There are a number of ways to implement a serial to parallel converter function in accordance with the present invention, depending upon specific design criteria or variables. One illustrative embodiment is provided by the following VERILOG-type pseudo-code segment:

```
module s2p(CLK, RESET, S_DI, data_rdy, P_DO);
  input CLK;
  input RESET;
  input S_DI;
  output data_rdy;
  output[9:0] P_DO;
  wire data_rdy;
  reg [9:0] shift_reg;
  reg [3:0] shift_cnt;
  reg data_rdy_int;
  assign P_DO=shift_reg[9:0];
  assign data_rdy=data_rdy_int;
  always@(posedge CLK or posedge RESET)
  if (RESET)
     shift_cnt<=4'b0000;
  else if (data_rdy_int)
     shift_cnt<=4'b0000;
  else if ((shift_cnt !=0) || S_DI)
     shift_cnt<=shift_cnt+1;
  always@(shift_cnt)
  if (shift_cnt==11)
     data_rdy_int=1'b1;
  else
     data_rdy_int=1'b0;
  always@(posedge CLK or posedge RESET)
  if (RESET)
     shift_reg<=10'b0000000000;
  else
     shift_reg<={shift_reg[8:0], S_DI};
endmodule
```

Figure 4:
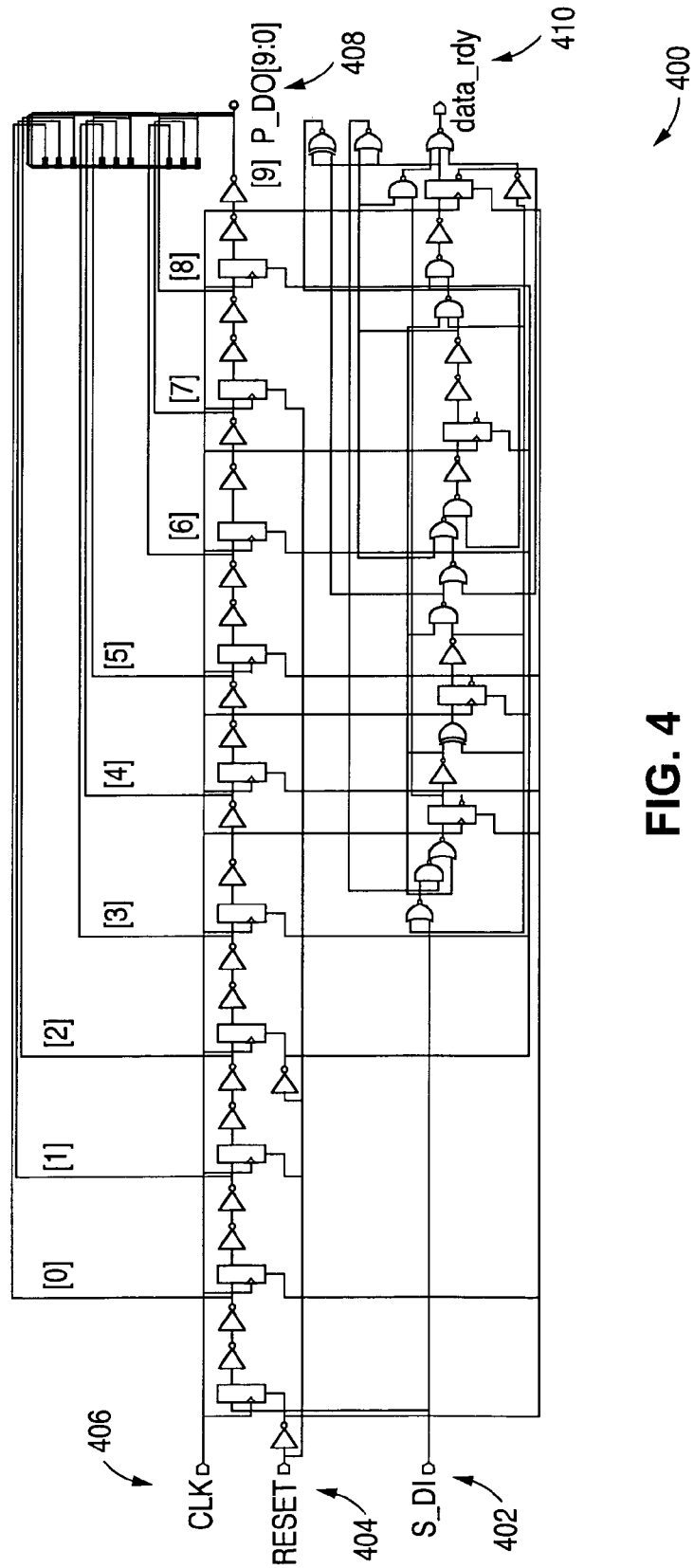
FIG. 4 provides an illustration depicting one embodiment of a serial to parallel converter illustrating certain aspects of the present invention.

For such an embodiment, a serial to parallel converter function (s2p) receives a serial input stream (S_DI), which has multiple frames and in which the first frame includes the number of frames for current input stream. This series input (S_DI) is latched and shifted to a 9-bit shift-register inside serial to parallel converter function, and when a 10$^{th}$ data bit is asserted, data in the 9-bit shift-register and the 10$^{th}$ data bit are output as parallel output P_DO[9:0], along with a data ready signal (data_rdy). FIG. 4 depicts one embodiment of a serial to parallel converter function 400 of the type described above. Function 400 comprises a series data input 402, a reset signal input 404, and a clock input 406. Function 400 provides a parallel output 408, and a data ready signal 410.

There are also a number of ways to implement a command decoder function in accordance with the present invention, depending upon specific design criteria or variables. One illustrative embodiment of a counter finite state machine (fsm) is provided by the following VERILOG-type pseudo-code segment:

```
module cnt_fsm (CLK, RESET, data_rdy, P_DO, LD, CNT);
  input CLK;
  input RESET;
  input data_rdy;
  input [9:0] P_DO;
  output LD;
  output [4:0] CNT;
  reg LD;
  reg [4:0] CNT;
  reg current_state;
  reg next_state;
  parameter ST_WAIT=1'b0;
  parameter ST_LOAD=1'b1;
  always@(posedge CLK or posedge RESET)
  if (RESET)
     current_state<=ST_WAIT;
  else
     current_state<=next_state;
  always@(current_state or data_rdy or P_DO)
  begin
  LD=1'b0;
  CNT=5'b00000;
```

```
case(current_state)
  ST_WAIT:
    if ((data_rdy) && (!P_DO[9]) && (!P_DO[8]))//
      check first frame
      next_state=ST_LOAD;
    else
      next_state=ST_WAIT;
  ST_LOAD:
    begin
      next_state=ST_WAIT;
      LD=1'b1;
      case (P_DO[7:0])
        8'b00000001: CNT=5'h0A;
        8'b00000010: CNT=5'h14;
        8'b00000100: CNT=5'h1E;
        default: CNT=5'h00;
      endcase
    end
endcase
end
endmodule
```

Figure 5:
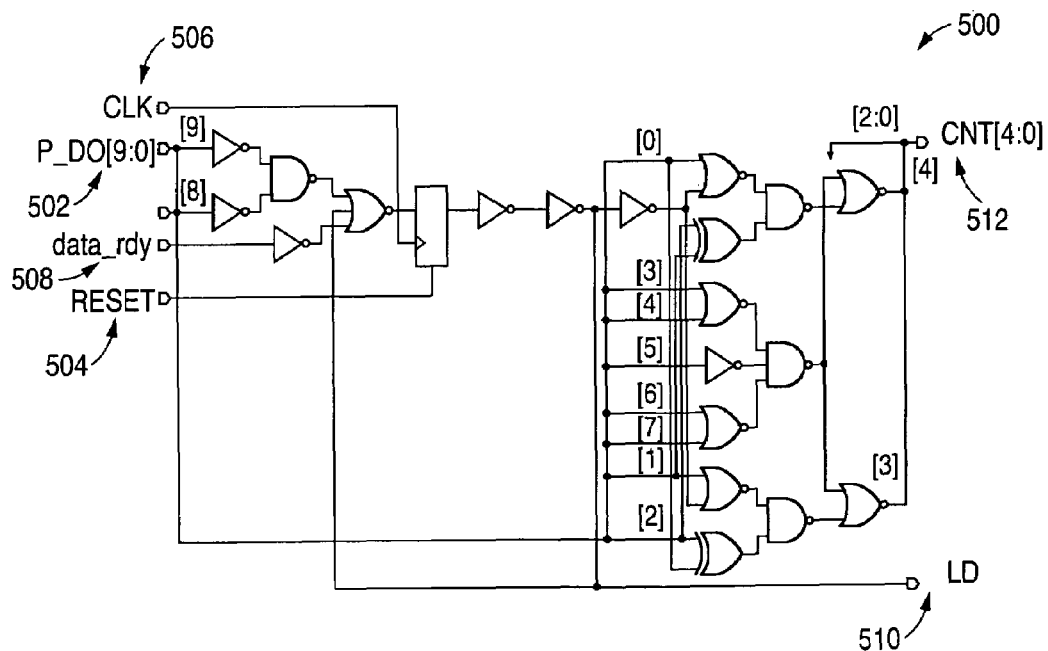
FIG. 5 provides an illustration depicting one embodiment of a command decoder illustrating certain aspects of the present invention.

For such an embodiment, when data ready signal (data_rdy) is asserted, the command decoder function checks frame order inside the first frame, which consists of 2-bit frame order (P_DO[9:8]), and 8-bit frame number (P-DO[7:0]). Along with the number of frames, counter value is set as the number of bits for the frame number. For example, P_DO[0]=1 indicates a 1-frame command, P_DO[1]=1 indicates a 2-frame command, and P_DO[3]=1 indicates a 3-frame command. For this example, counter value is set as 30. Command decoder function provides load signal 336 (LD) for counter 333 (DN5) inside disabler 304 of FIG. 3. FIG. 5 depicts one embodiment of a command decoder function 500, implementing the finite state machine scheme described above. Function 500 comprises a parallel data input 502, a reset signal input 504, a clock input 506, and a data ready input 508. Function 500 provides load signal output 510 (LD) and a counter value output 512 (CNT[4:0]).

Certain embodiments of the present invention may implement a clock/data synchronizer function of the type described in U.S. patent application Ser. No. 11/095,288, "System and Method for Providing a Robust Ultra Low Power Serial Interface with Digital Clock and Data Recovery Circuit for Power Management Systems." Depending upon certain design constraints or requirements, alternative embodiments may provide other similar constructs having the necessary functionality.

Thus, the present invention provides a system that manages clock operation for a single pin interface. When data transmission across the interface is idle, clocking is disabled. When data transmission across the interface begins, clocking is enabled. The serial data stream may be configured to initiate clocking by, for example, transmission of a special bit pattern that precedes data payload transmission. Information may also be embedded within fields or frames of the serial data stream that indicate the length of data payload to be transmitted. A down-counter may then be initiated to facilitate disabling clocking once the serial data stream ends. By enabling interface clocking only when a data interface is active, the present invention greatly reduces power consumption otherwise associated with continuous clock switching at the interface.

In all embodiments of the present invention, the constituent constructs, routines, functions or components may be implemented in a wide variety of ways—comprising various suitable software, firmware or hardware constructs, or combinations of thereof. For example, certain algorithms and routines described herein as firmware may also comprise separate code segments, grouped together in functional segments or incorporated as part of a larger integrated code segment. They may comprise software operating on a host computer system, or routines operating on a digital signal processor. Certain functions or operations may be provided in exclusively in discreet circuitry or system-level hardware. All of these variations, and all other similar variations and combinations, are comprehended by the present invention. All such embodiments may be employed to provide the benefits of the present invention.

The embodiments and examples set forth herein are therefore presented to best explain the present invention and its practical application, and to thereby enable those skilled in the art to make and utilize the invention. However, those skilled in the art will recognize that the foregoing description and examples have been presented for the purpose of illustration and example only. The teachings and principles of the present invention are applicable to a number of semiconductor device applications. The description as set forth herein is therefore not intended to be exhaustive or to limit the invention to the precise form disclosed. As stated throughout, many modifications and variations are possible in light of the above teaching without departing from the spirit and scope of the following claims.

What is claimed is:

1. A serial interface element comprising:
   a serial input configured to receive a serial input signal;
   a clock enabler function configured to receive the serial input signal and to output an enable/disable signal;
   a serial-to-parallel conversion function configured to receive the serial input signal and to output parallel output signals and a data ready signal;
   a decoder function configured to receive the parallel output signals and the data ready signal and to output a counter value and a load signal to the clock enabler function; and
   a clock/data synchronizer function configured to receive the serial input signal, the enable/disable signal, and an internal clock signal and to output a serial output signal and a synchronized clock signal, wherein the clock/data synchronizer function is configure to provide the synchronized clock signal to clock inputs of the clock enabler, serial-to-parallel conversion, and decoder functions.

2. The element of claim 1, wherein the element comprises a stand-alone device.

3. The element of claim 1, wherein the element comprises a functional portion of an integrated device.

4. The element of claim 1, wherein the clock enabler function comprises:
   an enabler element configured to receive a reset signal, the synchronized clock signal, and the serial signal and to output a trigger signal;
   a disabler element configured to receive the reset signal, the synchronized clock signal, the load signal, and the count value and to output a zero detector signal; and
   an enable/disable signal output configured to receive the trigger signal and the zero detector signal as inputs.

5. The element of claim 4, wherein the disabler element comprises a down-counter configured to receive the load signal and the count value as inputs.

6. The element of claim 4, wherein the enabler element comprises an edge-detection portion configured to receive the serial input signal.

7. The element of claim 1, wherein the serial-to-parallel conversion function comprises a shift-register configured to latch data from the serial input signal for output as parallel data.

8. The element of claim 1, wherein the decoder function comprises a finite state machine.

9. A method of providing a single pin serial interface comprising:
    receiving a serial input signal and outputting an enable/disable signal at a clock enabler;
    receiving the serial input signal and outputting parallel output signals and a data ready signal at a serial-to-parallel converter;
    receiving the parallel output signals and the data ready signal and outputting a counter value and a load signal to the clock enabler function at a decoder; and
    receiving the serial input signal, the enable/disable signal, and an internal clock signal and outputting a serial output signal and a synchronized clock signal at a clock/data synchronizer, wherein the synchronized clock signal is provided to clock inputs of the clock enabler, the serial-to-parallel converter, and the decoder.

10. The method of claim 9, wherein the single pin serial interface comprises a stand-alone device.

11. The method of claim 9, wherein the single pin serial interface comprises a functional portion of an integrated device.

12. The method of claim 9, wherein receiving the serial input signal and outputting the enable/disable signal at the clock enabler comprises:
    receiving a reset signal, the synchronized clock signal, and the serial input signal and outputting a trigger signal at an enabler element;
    receiving the reset signal, the synchronized clock signal, the load signal, and the count value and outputting a zero detector signal at a disabler element; and
    receiving the trigger signal and the zero detector signal as inputs at an enable/disable signal output.

13. The method of claim 12, wherein
    receiving the reset signal, the synchronized clock signal, the load signal, and the count value and outputting the zero detector signal at the disabler element comprises receiving the load signal and the count value as inputs at a down-counter.

14. The method of claim 12, wherein
    receiving the reset signal, the synchronized clock signal, and the serial input signal and outputting trigger signal at the enabler element comprises receiving the serial input signal at an edge-detection portion.

15. The method of claim 9, wherein receiving the serial input signal and outputting the parallel output signal at the serial-to-parallel converter comprises latching data from the serial input signal for output as parallel data at a shift-register.

16. The method of claim 9, wherein the step of receiving the parallel output signals and the data ready signal and outputting the counter value and the load signal at the decoder comprises using a finite state machine.

17. A method of providing clock management for a serial interface, the method comprising the steps of:
    receiving serial input data comprising a plurality of fields, including receiving an indicator of a size of serial data payload in one of the plurality of fields;
    identifying a specific input pattern leading transmission of the serial input data;
    asserting a clock enable signal responsive to identifying the specific input pattern;
    establishing a count-down corresponding to the size of the serial data payload; and
    disabling the clock enable signal once the count-down reaches zero.

18. The method of claim 17, wherein the step of receiving the serial input data comprises receiving the serial input data in a plurality of frames.

19. The method of claim 18, wherein the step of receiving the serial input data comprises receiving current data frame order information.

20. The method of claim 18, wherein the step of receiving the indicator of the size of the serial data payload comprises receiving a number of frames of current data.

* * * * *

UNITED STATES PATENT AND TRADEMARK OFFICE
CERTIFICATE OF CORRECTION

| | | |
|---|---|---|
| PATENT NO. | : 7,716,507 B1 | Page 1 of 1 |
| APPLICATION NO. | : 11/225500 | |
| DATED | : May 11, 2010 | |
| INVENTOR(S) | : Dae Woon Kang | |

It is certified that error appears in the above-identified patent and that said Letters Patent is hereby corrected as shown below:

Column 8, claim 4, line 55, insert --input-- after the term "serial";

Column 10, claim 14, line 6, insert --the-- after the term "outputting"; and

Column 10, claim 16, line 13, delete "the step of".

Signed and Sealed this

Twenty-ninth Day of March, 2011

David J. Kappos
*Director of the United States Patent and Trademark Office*